United States Patent
Miess et al.

(10) Patent No.: US 10,760,615 B2
(45) Date of Patent: *Sep. 1, 2020

(54) POLYCRYSTALLINE DIAMOND THRUST BEARING AND ELEMENT THEREOF

(71) Applicant: XR Downhole, LLC, Houston, TX (US)

(72) Inventors: David P. Miess, Spring, TX (US);
Edward C. Spatz, Spring, TX (US);
Michael R. Reese, Houston, TX (US);
Gregory Prevost, Spring, TX (US);
Michael Williams, Houston, TX (US);
William W. King, Houston, TX (US)

(73) Assignee: XR Downhole, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/049,617

(22) Filed: Jul. 30, 2018

(65) Prior Publication Data

US 2020/0032846 A1 Jan. 30, 2020

(51) Int. Cl.
*F16C 33/04* (2006.01)
*F16C 17/04* (2006.01)

(52) U.S. Cl.
CPC ............ *F16C 33/043* (2013.01); *F16C 17/04* (2013.01); *F16C 2202/02* (2013.01); *F16C 2202/50* (2013.01); *F16C 2206/04* (2013.01); *F16C 2223/02* (2013.01)

(58) Field of Classification Search
CPC .......... F16C 17/02; F16C 17/04; F16C 17/10; F16C 17/105; F16C 33/043; F16C 2206/04; F16C 2380/26
See application file for complete search history.

(56) References Cited

U.S. PATENT DOCUMENTS

| | | | |
|---|---|---|---|
| 1,963,956 A | 6/1934 | James |
| 2,259,023 A | 10/1941 | Clark |
| 2,299,978 A | 10/1942 | Hall |
| 2,567,735 A | 9/1951 | Scott |
| 2,758,181 A | 8/1956 | Crouch |
| 2,788,677 A | 4/1957 | Hayek |

(Continued)

FOREIGN PATENT DOCUMENTS

| | | |
|---|---|---|
| JP | 06174051 A | 6/1994 |
| WO | 2004001238 A2 | 12/2003 |
| WO | 2017105883 A1 | 6/2017 |

OTHER PUBLICATIONS

Bovenkerk, Dr. H. P.; Bundy, Dr. F. P.; Hall, Dr. H. T.; Strong, Dr. H. M.; Wentorf, Jun., Dr. R. H.; Preparation of Diamond, Nature, Oct. 10, 1959, pp. 1094-1098, vol. 184.

(Continued)

*Primary Examiner* — James Pilkington
(74) *Attorney, Agent, or Firm* — Michael S. McCoy; Amatong McCoy LLC

(57) ABSTRACT

A thrust bearing assembly is provided, including a thrust ring defining a thrust face and an opposing thrust ring defining an opposing thrust face. At least one polycrystalline diamond element is coupled with the thrust face and defines an engagement surface. The opposing thrust ring includes a diamond reactive material. In operation, the engagement surface is in contact with the opposing thrust face. Also provided are methods of making, assembling, and using the same, as well as to systems and apparatus including the same.

35 Claims, 7 Drawing Sheets

(56) References Cited

U.S. PATENT DOCUMENTS

| | | |
|---|---|---|
| 2,877,662 A | 3/1959 | Eduard |
| 2,897,016 A | 7/1959 | Baker |
| 2,947,609 A | 8/1960 | Strong |
| 2,947,610 A | 8/1960 | Hall et al. |
| 3,559,802 A | 2/1971 | Eidus |
| 3,650,714 A | 3/1972 | Farkas |
| 3,697,141 A | 10/1972 | Garrett |
| 3,741,252 A | 6/1973 | Williams |
| 3,745,623 A | 7/1973 | Wentorf et al. |
| 3,866,987 A | 2/1975 | Garner |
| 3,869,947 A | 3/1975 | Vandenkieboom |
| 3,920,290 A | 11/1975 | Evarts |
| 4,085,634 A | 4/1978 | Sattler |
| 4,182,537 A | 1/1980 | Oster |
| 4,225,322 A | 9/1980 | Knemeyer |
| 4,238,137 A | 12/1980 | Furchak et al. |
| 4,285,550 A | 8/1981 | Blackburn et al. |
| 4,398,772 A | 8/1983 | Odell |
| 4,410,054 A | 10/1983 | Nagel et al. |
| 4,410,284 A | 10/1983 | Herrick |
| 4,468,138 A | 8/1984 | Nagel |
| 4,554,208 A | 11/1985 | MacIver et al. |
| 4,560,014 A | 12/1985 | Geczy |
| 4,620,601 A | 11/1986 | Nagel |
| RE32,380 E | 3/1987 | Wentorf, Jr. et al. |
| 4,662,348 A | 5/1987 | Hall et al. |
| 4,679,639 A | 7/1987 | Barr et al. |
| 4,689,847 A | 9/1987 | Huber |
| 4,720,199 A | 1/1988 | Geczy et al. |
| 4,729,440 A | 3/1988 | Hall |
| 4,732,490 A | 3/1988 | Masciarelli |
| 4,764,036 A | 8/1988 | McPherson |
| 4,796,670 A | 1/1989 | Russell et al. |
| 4,797,011 A | 1/1989 | Saeki et al. |
| 4,858,688 A | 8/1989 | Edwards et al. |
| 4,906,528 A | 3/1990 | Cerceau et al. |
| 4,958,692 A | 9/1990 | Anderson |
| 5,011,514 A | 4/1991 | Cho et al. |
| 5,011,515 A | 4/1991 | Frushour |
| 5,030,276 A | 7/1991 | Sung et al. |
| 5,037,212 A | 8/1991 | Justman et al. |
| 5,066,145 A | 11/1991 | Sibley et al. |
| 5,067,826 A | 11/1991 | Lemelson |
| 5,092,687 A | 3/1992 | Hall |
| 5,112,146 A | 5/1992 | Stangeland |
| 5,151,107 A | 9/1992 | Cho et al. |
| 5,205,188 A | 4/1993 | Repenning et al. |
| 5,253,939 A | 10/1993 | Hall |
| 5,271,749 A | 12/1993 | Rai et al. |
| 5,351,770 A | 10/1994 | Cawthorne et al. |
| 5,358,041 A | 10/1994 | O'Hair |
| 5,358,337 A | 10/1994 | Codatto |
| 5,375,679 A | 12/1994 | Biehl |
| 5,385,715 A | 1/1995 | Fish |
| 5,447,208 A | 9/1995 | Lund et al. |
| 5,462,362 A | 10/1995 | Yuhta et al. |
| 5,464,086 A | 11/1995 | Coelln |
| 5,522,467 A | 6/1996 | Stevens et al. |
| 5,533,604 A | 7/1996 | Brierton |
| 5,538,346 A | 7/1996 | Frias et al. |
| 5,540,314 A | 7/1996 | Coelln |
| 5,560,716 A | 10/1996 | Tank et al. |
| 5,653,300 A | 8/1997 | Lund et al. |
| 5,715,898 A | 2/1998 | Anderson |
| 5,833,019 A | 11/1998 | Gynz-Rekowski |
| 5,855,996 A | 1/1999 | Corrigan et al. |
| 5,948,541 A | 9/1999 | Inspektor |
| 6,109,790 A | 8/2000 | Gynz-Rekowski et al. |
| 6,120,185 A | 9/2000 | Masciarelli, Jr. |
| 6,129,195 A | 10/2000 | Matheny |
| 6,152,223 A | 11/2000 | Abdo et al. |
| 6,164,109 A | 12/2000 | Bartosch |
| 6,279,716 B1 | 8/2001 | Kayatani et al. |
| 6,378,633 B1 | 4/2002 | Moore et al. |
| 6,409,388 B1 | 6/2002 | Lin |
| 6,457,865 B1 | 10/2002 | Masciarelli, Jr. |
| 6,488,103 B1 | 12/2002 | Dennis et al. |
| 6,488,715 B1 | 12/2002 | Pope et al. |
| 6,516,934 B2 | 2/2003 | Masciarelli, Jr. |
| 6,652,201 B2 | 11/2003 | Kunimori et al. |
| 6,655,845 B1 | 12/2003 | Pope et al. |
| 6,737,377 B1 | 5/2004 | Sumiya et al. |
| 6,808,019 B1 | 10/2004 | Mabry |
| 6,814,775 B2 | 11/2004 | Scurlock et al. |
| 7,007,787 B2 | 3/2006 | Pallini et al. |
| 7,198,043 B1 | 4/2007 | Zhang |
| 7,475,744 B2 | 1/2009 | Pope |
| 7,552,782 B1 | 6/2009 | Sexton et al. |
| 7,703,982 B2 | 4/2010 | Cooley |
| 7,737,377 B1 | 6/2010 | Dodal et al. |
| 7,845,436 B2 | 12/2010 | Cooley et al. |
| 7,861,805 B2 | 1/2011 | Dick et al. |
| 8,069,933 B2 | 12/2011 | Sexton et al. |
| 8,109,247 B2 | 2/2012 | Wakade et al. |
| 8,277,722 B2 | 10/2012 | DiGiovanni |
| 8,485,284 B2 | 7/2013 | Sithebe |
| 8,613,554 B2 | 12/2013 | Tessier et al. |
| 8,627,904 B2 | 1/2014 | Voronin |
| 8,678,657 B1 | 3/2014 | Knuteson et al. |
| 8,701,797 B2 | 4/2014 | Baudoin |
| 8,763,727 B1 | 7/2014 | Cooley et al. |
| 8,764,295 B2 | 7/2014 | Dadson et al. |
| 8,881,849 B2 | 11/2014 | Shen et al. |
| 9,004,198 B2 | 4/2015 | Kulkarni |
| 9,010,418 B2 | 4/2015 | Pereyra et al. |
| 9,145,743 B2 | 9/2015 | Shen et al. |
| 9,404,310 B1 | 8/2016 | Sani et al. |
| 9,488,221 B2 | 11/2016 | Gonzalez |
| 9,562,562 B2 | 2/2017 | Peterson |
| 9,643,293 B1 | 5/2017 | Miess et al. |
| 9,702,401 B2 | 7/2017 | Gonzalez |
| 9,790,749 B2 | 10/2017 | Chen |
| 9,790,818 B2 | 10/2017 | Berruet et al. |
| 9,803,432 B2 | 10/2017 | Wood et al. |
| 9,822,523 B1 | 11/2017 | Miess |
| 9,840,875 B2 | 12/2017 | Harvey et al. |
| 9,869,135 B1 | 1/2018 | Martin |
| 10,113,362 B2 | 10/2018 | Ritchie et al. |
| 10,294,986 B2 | 5/2019 | Gonzalez |
| 10,307,891 B2 | 6/2019 | Daniels et al. |
| 2002/0020526 A1 | 2/2002 | Male et al. |
| 2003/0159834 A1 | 8/2003 | Kirk et al. |
| 2004/0031625 A1 | 2/2004 | Lin et al. |
| 2004/0219362 A1 | 11/2004 | Wort et al. |
| 2007/0046119 A1 | 3/2007 | Cooley |
| 2008/0217063 A1 | 9/2008 | Moore et al. |
| 2008/0253706 A1 | 10/2008 | Bischof et al. |
| 2009/0020046 A1 | 1/2009 | Marcelli |
| 2010/0037864 A1 | 2/2010 | Dutt et al. |
| 2011/0203791 A1 | 8/2011 | Jin et al. |
| 2011/0220415 A1 | 9/2011 | Jin et al. |
| 2011/0297454 A1 | 12/2011 | Shen et al. |
| 2013/0000442 A1 | 1/2013 | Wiesner et al. |
| 2013/0004106 A1 | 1/2013 | Wenzel |
| 2013/0146367 A1 | 6/2013 | Zhang et al. |
| 2014/0254967 A1 | 9/2014 | Gonzalez |
| 2015/0132539 A1 | 5/2015 | Bailey et al. |
| 2016/0153243 A1 | 6/2016 | Hinz et al. |
| 2016/0312535 A1 | 10/2016 | Ritchie et al. |
| 2017/0138224 A1 | 5/2017 | Henry et al. |
| 2017/0234071 A1 | 8/2017 | Spatz et al. |
| 2018/0087134 A1 | 3/2018 | Chang et al. |
| 2018/0209476 A1 | 7/2018 | Gonzalez |
| 2019/0063495 A1 | 2/2019 | Peterson et al. |

OTHER PUBLICATIONS

Chen, Y.; Nguyen, T; Zhang, L.C.; Polishing of polycrystalline diamond by the technique of dynamic friction—Part 5: Quantitative analysis of material removal, International Journal of Machine Tools & Manufacture, 2009, pp. 515-520, vol. 49, Elsevier.

Chen, Y.; Zhang, L.C.; Arsecularatne, J.A.; Montross, C.; Polishing of polycrystalline diamond by the technique of dynamic friction,

(56) References Cited

OTHER PUBLICATIONS part 1: Prediction of the interface temperature rise, International Journal of Machine Tools & Manufacture, 2006, pp. 580-587, vol. 46, Elsevier.
Chen, Y.; Zhang, L.C.; Arsecularatne, J.A.; Polishing of polycrystalline diamond by the technique of dynamic friction. Part 2: Material removal mechanism, International Journal of Machine Tools & Manufacture, 2007, pp. 1615-1624, vol. 47, Elsevier.
Chen, Y.; Zhang, L.C.; Arsecularatne, J.A.; Zarudi, I., Polishing of polycrystalline diamond by the technique of dynamic friction, part 3: Mechanism exploration through debris analysis, International Journal of Machine Tools & Manufacture, 2007, pp. 2282-2289, vol. 47, Elsevier.
Chen, Y.; Zhang, L.C.; Polishing of polycrystalline diamond by the technique of dynamic friction, part 4: Establishing the polishing map, International Journal of Machine Tools & Manufacture, 2009, pp. 309-314, vol. 49, Elsevier.
Dobrzhinetskaya, Larissa F.; Green, II, Harry W.; Diamond Synthesis from Graphite in the Presence of Water and SiO2: Implications for Diamond Formation in Quartzites from Kazakhstan, International Geology Review, 2007, pp. 389-400, vol. 49.
Hudson Bearings Air Cargo Ball Transfers brochure, 8 Pages, Columbus, Ohio.
Hudson Bearings Air Cargo Ball Transfers Installation and Maintenance Protocols, pp. 1-5.
Liao, Y.; Marks, L.; In situ single asperity wear at the nanometre scale, International Materials Reviews, 2016, pp. 1-17, Taylor & Francis.
Machinery's Handbook 30th Edition, Copyright Page and Coefficients of Friction Page, 2016, p. 158 (2 Pages total), Industrial Press, Inc., South Norwalk, U.S.A.
McCarthy, J. Michael; Cam and Follower Systems, PowerPoint Presentation, Jul. 25, 2009, pp. 1-14, UCIrvine The Henry Samueli School of Engineering.
McGill Cam Follower Bearings brochure, 2005, p. 1-19, Back Page, Brochure MCCF-05, Form #8991 (20 Pages total).
Motion & Control NSK Cam Followers (Stud Type Track Rollers) Roller Followers (Yoke Type Track Rollers) catalog, 1991, Cover Page, pp. 1-18, Back Page, CAT. No. E1421 2004 C-11, Japan.
Product Catalogue, Asahi Diamond Industrial Australia Pty. Ltd., Cover Page, Blank Page, 2 Notes Pages, Table of Contents, pp. 1-49 (54 Pages total).
RBC Aerospace Bearings Rolling Element Bearings catalog, 2008, Cover Page, First Page, pp. 1-149, Back Page (152 Pages total).
RGPBalls Ball Transfer Units catalog, pp. 1-26, 2 Back Pages (28 Pages total).
Sandvik Coromant Hard part turning with CBN catalog, 2012, pp. 1-42, 2 Back Pages (44 Pages total).
Sexton, Timothy N.; Cooley, Craig H.; Diamond Bearing Technology for Deep and Geothermal Drilling, PowerPoint Presentation, 2010, 16 Pages.
SKF Ball transfer units catalog, Dec. 2006, Cover Page, Table of Contents, pp. 1-36, 2 Back Pages (40 Pages total), Publication 940-711.
Sowers, Jason Michael, Examination of the Material Removal Rate in Lapping Polycrystalline Diamond Compacts, A Thesis, Aug. 2011, 2 Cover Pages, pp. iii-xiv, pp. 1-87 (101 Pages total).
Sun, Liling; Wu, Qi; Dai, Daoyang; Zhang, Jun; Qin, Zhicheng; Wang, Wenkui; Non-metallic catalysts for diamond synthesis under high pressure and high temperature, Science in China (Series A), Aug. 1999, pp. 834-841, vol. 42 No. 8, China.
United States Defensive Publication No. T102,901, published Apr. 5, 1983, in U.S. Appl. No. 298,271 [2 Pages].
USSynthetic Bearings and Waukesha Bearings brochure for Diamond Tilting Pad Thrust Bearings, 2015, 2 Pages.
USSynthetic Bearings brochure, 12 Pages, Orem, Utah.
Zhigadlo, N. D., Spontaneous growth of diamond from MnNi solvent-catalyst using opposed anvil-type high-pressure apparatus, pp. 1-12, Laboratory for Solid State Physics, Switzerland.
Zou, Lai; Huang, Yun; Zhou, Ming; Xiao, Guijian; Thermochemical Wear of Single Crystal Diamond Catalyzed by Ferrous Materials at Elevated Temperature, Crystals, 2017, pp. 1-10, vol. 7.
Final Office Action dated Jan. 13, 2020, issued in U.S. Appl. No. 16/049,608 [26 pages].
Response to Non-Final Office Action dated Aug. 13, 2019, filed in U.S. Appl. No. 16/049,608, filed Dec. 9, 2019 [19 pages].
Element six, The Element Six CVD Diamond Handbook, Accessed on Nov. 1, 2019, 28 pages.
Grossman, David, What the World Needs Now is Superhard Carbon, Popular Mechanics, https://www.popularmechanics.com/science/environment/a28970718/superhard-materials/,Sep. 10, 2019, 7 pages, Hearst Magazine Media, Inc.
Machinery's Handbook, 2016, Industrial Press, Inc., 30th edition, pp. 843 and 1055 (6 pages total).
Superhard Material, Wikipedia, https://en.wikipedia.org/wiki/Superhard_material, Retrieved from https://en.wikipedia.org/w/index.php?title=Superhard_material&oldid=928571597, Nov. 30, 2019, 14 pages.
Surface Finish, Wikipedia, https://en.wikipedia.org/wiki/Surface_finish,Retrieved from https://en.wikipedia.org/w/index.php?title=Surface_finish&oldid=919232937, Oct. 2, 2019, 3 pages.
Zeidan, Fouad Y.; Paquette, Donald J., Application of High Speed and High Performance Fluid Film Bearings in Rotating Machinery, 1994, pp. 209-234.
International Search Report and Written Opinion dated Oct. 29, 2019 (issued in PCT Application No. PCT/US2019/043741) [15 pages].
International Search Report and Written Opinion dated Oct. 21, 2019 (issued in PCT Application No. PCT/US2019/043746) [14 pages].
International Search Report and Written Opinion dated Oct. 22, 2019 (issued in PCT Application No. PCT/US2019/043744) [11 pages].
International Search Report and Written Opinion dated Oct. 25, 2019 (issued in PCT Application No. PCT/US2019/044682) [20 pages].
International Search Report and Written Opinion dated Sep. 9, 2019 (issued in PCT Application No. PCT/US2019/043732) [10 pages].

POLYCRYSTALLINE DIAMOND THRUST BEARING AND ELEMENT THEREOF

CROSS-REFERENCE TO RELATED APPLICATIONS

The present application is related to U.S. patent application Ser. No. 15/430,254 (pending) entitled Drilling Machine filed Feb. 10, 2017 and assigned to the same assignee as the present application and which is incorporated herein in its entirety as if set out in full. The present application is also related to the concurrently filed U.S. patent application Ser. No. 16/049,631 (pending) entitled "Roller Ball Assembly with Superhard Elements"; t the concurrently filed U.S. patent application Ser. No. 16/049,588 (pending) entitled "Cam Follower with Polycrystalline Diamond Engagement Element"; and the concurrently filed U.S. patent application Ser. No. 16/049,608 entitled "Polycrystalline Diamond Radial Bearing", each of which is assigned to the same assignee as the present application and is incorporated herein by reference in its entirety as if set out in full.

STATEMENT REGARDING FEDERALLY SPONSORED RESEARCH OF DEVELOPMENT

Not applicable.

FIELD

The present disclosure relates to thrust bearings, apparatus and systems including the same, and methods of making, assembling, and using the same.

BACKGROUND

Thrust bearings are used in tools, machines, and components to, at least predominately, bear axial load. Thermally stable polycrystalline diamond (TSP), either supported or unsupported by tungsten carbide, and polycrystalline diamond compact (PDC or PCD) have been considered as contraindicated for use in the machining of diamond reactive materials, including ferrous metals, and other metals, metal alloys, composites, hard facings, coatings, or platings that contain more than trace amounts of diamond catalyst or solvent elements including cobalt, nickel, ruthenium, rhodium, palladium, chromium, manganese, copper, titanium, or tantalum. Further, this prior contraindication of the use of polycrystalline diamond extends to so called "superalloys", including iron-based, cobalt-based and nickel-based superalloys containing more than trace amounts of diamond catalyst or solvent elements. The surface speeds typically used in machining of such materials typically ranges from about 0.2 m/s to about 5 m/s. Although these surface speeds are not particularly high, the load and attendant temperature generated, such as at a cutting tip, often exceeds the graphitization temperature of diamond (i.e., about 700° C. or 973.15 K), which can, in the presence of diamond catalyst or solvent elements, lead to rapid wear and failure of components. Without being bound by theory, the specific failure mechanism is believed to result from the chemical interaction of the carbon bearing diamond with the carbon attracting material that is being machined. An exemplary reference concerning the contraindication of polycrystalline diamond for diamond catalyst or solvent containing metal or alloy machining is U.S. Pat. No. 3,745,623, which is incorporated herein by reference in its entirety. The contraindication of polycrystalline diamond for machining diamond catalyst or diamond solvent containing materials has long caused the avoidance of the use of polycrystalline diamond in all contacting applications with such materials.

Over time, as polycrystalline diamond bearings were developed, bearing makers either matched the polycrystalline diamond bearing surfaces with non-ferrous, so called superhard materials or, much more commonly, with tightly facing complementary polycrystalline diamond surfaces. FIG. 1 depicts a partial cutaway view of thrust bearing 100, having a polycrystalline diamond to polycrystalline diamond interface. As used herein, "superhard" materials are defined as materials at least as hard as tungsten carbide (e.g., cemented tungsten carbide or tungsten carbide tiles) or harder, including, but not limited to, tungsten carbide, infiltrated tungsten carbide matrix, silicon carbide, silicon nitride, cubic boron nitride, and polycrystalline diamond. As would be understood by one skilled in the art, hardness may be determined using the Brinell scale, such as in accordance with ASTM E10-14. Exemplary references concerning polycrystalline diamond thrust bearings are U.S. Pat. No. 4,468,138 to Nagel; U.S. Pat. No. 4,560,014 to Geczy; U.S. Pat. No. 9,702,401 to Gonzalez; and U.S. Defensive Publication T102,90 to Offenbacher, the entireties of each of which are incorporated herein by reference.

High performance polycrystalline diamond thrust bearings designed particularly for harsh environments, such as downhole drilling and pumping, or wind turbine energy units, typically utilize sliding, mated, overlapping polycrystalline diamond elements. This requires a large number of polycrystalline diamond elements, each in exacting flat engagement with an opposing set of polycrystalline diamond elements. The polycrystalline diamond elements must be mounted at exactly prescribed heights or exposures to insure mated sliding engagement. The goal in the prior art is full face contact of the polycrystalline diamond elements on both faces as bearing areas. Failures in alignment and/or exposure are likely to produce point loading, uneven load sharing or "edge clashing" as the polycrystalline diamond elements rotate against each other producing fractured elements and, ultimately, bearing failure. Polycrystalline diamond is more brittle and prone to impact damage than diamond reactive material (defined herein below).

Table 1, below, sets for a summary of coefficients of friction for various materials, including polished polycrystalline diamond, in both a dry, static state and a lubricated, static state, where the "first material" is the material that is moved relative to the "second material" to determine the CoF of the first material.

TABLE 1*

| First Material | Second Material | Dry Static | Lubricated Static |
|---|---|---|---|
| Hard Steel | Hard Steel | 0.78 | 0.05-0.11 |
| Tungsten Carbide | Tungsten Carbide | 0.2-0.25 | 0.12 |
| Diamond | Metal | 0.1-0.15 | 0.1 |
| Diamond | Diamond | 0.1 | 0.05-0.1 |
| Polished PDC | Polished PDC | Estimated 0.08-1 | Estimated 0.05-0.08 |
| Polished PDC | Hard Steel | Estimated 0.08-0.12 | Estimated 0.08-0.1 |

*References include Machinery's Handbook; Sexton T N, Cooley C H. Polycrystalline diamond thrust bearings for down-hole oil and gas drilling tools. Wear 2009; 267: 1041-5.

Additional significant references that inform the background of the technology of this application are from the International Journal of Machine Tools & Manufacture 46 and 47 titled "Polishing of polycrystalline diamond by the technique of dynamic friction, part 1: Prediction of the interface temperature rise" and "Part 2, Material removal mechanism" 2005 and 2006. These references report on the dynamic friction polishing of PDC faces utilizing dry sliding contact under load with a carbon attractive steel disk. Key findings in these references indicate that polishing rate is more sensitive to sliding rate than load and that the rate of thermo-chemical reaction between the steel disk and the diamond surface reduces significantly as the surface finish of the diamond surface improves. The authors reference Iwai, Manabu & Uematsu, T & Suzuki, K & Yasunaga, N. (2001). "High efficiency polishing of PCD with rotating metal disc." Proc. of ISAAT2001.231-238. which concludes that the thermo-chemical reaction between the steel disk and the PDC face does not occur at sliding speeds below 10.5 m/s at a pressure of 27 MPa. These references are incorporated herein by reference, as if set out in full. It should be emphasized that the above numerical values are based on dry running in air. Clearly, if running in a liquid cooled, lubricated environment, higher speeds and loads can be attained without commencing the thermo-chemical reaction. Also, of note is the lower thermo-chemical response of a polycrystalline diamond face that has been polished. Copper and titanium were not typically listed in the early General Electric documentation on diamond synthesis but have been added later. Relevant references include "Diamond Synthesis from Graphite in the Presence of Water and $SiO_2$"; Dobrzhinetskaya and Green, II International Geology Review Vol. 49, 2007 and "Non-metallic catalysts for diamond synthesis under high pressure and high temperature", Sun et al, Science in China August 1999.

BRIEF SUMMARY

Some aspects of the present disclosure include a thrust bearing assembly. The thrust bearing assembly includes a thrust face having a polycrystalline diamond element. The polycrystalline diamond element has an engagement surface thereon. The thrust bearing assembly includes an opposing thrust face formed of or including at least some diamond reactive material. The thrust face is coupled with the opposing thrust face such that the engagement surface is in contact with the opposing thrust face.

Other aspects of the present disclosure include a method of bearing axial load. The method includes coupling a thrust face with an opposing thrust face. The thrust face includes a polycrystalline diamond element coupled therewith. The polycrystalline diamond element has an engagement surface thereon. The opposing thrust face is formed of or including at least some diamond reactive material. The thrust face is coupled with the opposing thrust face such that the engagement surface is in contact with the opposing thrust face.

Another aspect of the present disclosure includes a thrust bearing assembly that includes a thrust ring defining a thrust face. A polycrystalline diamond element is coupled with the thrust face and defines an engagement surface. The thrust bearing assembly also includes an opposing thrust ring defining an opposing thrust face. The opposing thrust ring is formed of or including at least some diamond reactive material. The engagement surface is in contact with the opposing thrust face.

BRIEF DESCRIPTION OF THE DRAWINGS

So that the manner in which the features and advantages of the systems, apparatus, and/or methods of the present disclosure may be understood in more detail, a more particular description briefly summarized above may be had by reference to the embodiments thereof which are illustrated in the appended drawings that form a part of this specification. It is to be noted, however, that the drawings illustrate only various exemplary embodiments and are therefore not to be considered limiting of the disclosed concepts as it may include other effective embodiments as well.

Figure 1:
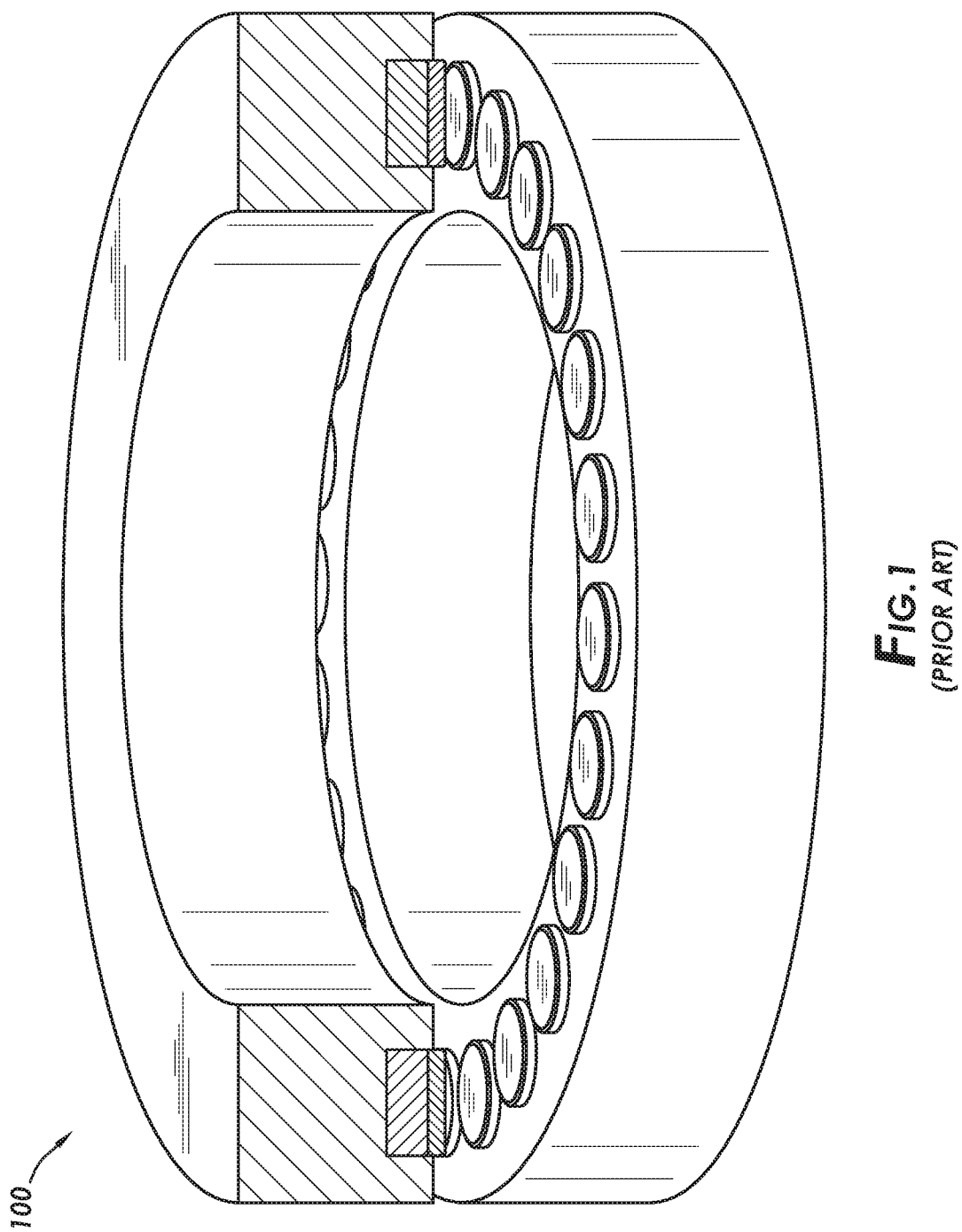
FIG. 1 is a partial cutaway view of a polycrystalline diamond to polycrystalline diamond interface thrust bearing of the prior art.

Systems, apparatus, and methods according to present disclosure will now be described more fully with reference to the accompanying drawings, which illustrate various exemplary embodiments. Concepts according to the present disclosure may, however, be embodied in many different forms and should not be construed as being limited by the illustrated embodiments set forth herein. Rather, these embodiments are provided so that this disclosure will be thorough as well as complete and will fully convey the scope of the various concepts to those skilled in the art and the best and preferred modes of practice.

DETAILED DESCRIPTION

Certain aspects of the present disclosure include thrust bearings and thrust bearing assemblies, as well apparatus and systems including the same, and to methods of making, assembling, and using the same. In the thrust bearings, one thrust face is formed of or includes at least some polycrystalline diamond and the other, opposing thrust face is formed of or includes at least some diamond reactive material.

Diamond Reactive Materials

As used herein, a "diamond reactive material" is a material that contains more than trace amounts of diamond catalyst or diamond solvent. As used herein, a diamond reactive material that contains more than "trace amounts" of diamond catalyst or diamond solvent contains at least 2 percent by weight (wt. %) diamond catalyst or diamond solvent. In some aspects, the diamond reactive materials disclosed herein contain from 2 to 100 wt. %, or from 5 to 95 wt. %, or from 10 to 90 wt. %, or from 15 to 85 wt. %, or from 20 to 80 wt. %, or from 25 to 75 wt. %, or from 25 to 70 wt. %, or from 30 to 65 wt. %, or from 35 to 60 wt. %, or from 40 to 55 wt. %, or from 45 to 50 wt. % of diamond catalyst or diamond solvent. As used herein, a "diamond catalyst" is a chemical element, compound, or material capable of catalyzing graphitization of polycrystalline diamond, such as under load and at a temperature at or exceeding the graphitization temperature of diamond (i.e., about 700° C. or 973.15 K). As used herein, a "diamond solvent" is a chemical element, compound, or material capable of solubilizing polycrystalline diamond, such as under load and at a temperature at or exceeding the graphitization temperature of diamond. Thus, diamond reactive materials include materials that, under load and at a temperature at or exceeding the graphitization temperature of diamond, can lead to wear, sometimes rapid wear, and failure of components formed of or includes at least some polycrystalline diamond, such as diamond tipped tools.

Diamond reactive materials include, but are not limited to, metals, metal alloys, and composite materials that contain more than trace amounts of diamond catalyst or solvent elements. In some aspects, the diamond reactive materials are in the form of hard facings, coatings, or platings. For example, and without limitation, the diamond reactive material may be ferrous, cobalt, nickel, ruthenium, rhodium, palladium, chromium, manganese, copper, titanium, tantalum, or alloys thereof. In some aspects, the diamond reactive material is a superalloy including, but not limited to, iron-based, cobalt-based and nickel-based superalloys. In certain aspects, the diamond reactive material is not and/or does not include (i.e., specifically excludes) so called "superhard materials." As would be understood by one skilled in the art, "superhard materials" are a category of materials defined by the hardness of the material, which may be determined in accordance with the Brinell, Rockwell, Knoop and/or Vickers scales. For example, superhard materials include materials with a hardness value exceeding 40 gigapascals (GPa) when measured by the Vickers hardness test. As used herein, superhard materials include materials that are at least as hard as tungsten carbide tiles and/or cemented tungsten carbide, such as is determined in accordance with one of these hardness scales, such as the Brinell scale. One skilled in the art would understand that a Brinell scale test may be performed, for example, in accordance with ASTM E10-14; the Vickers hardness test may be performed, for example, in accordance with ASTM E384; the Rockwell hardness test may be performed, for example, in accordance with ASTM E18; and the Knoop hardness test may be performed, for example, in accordance with ASTM E384. The "superhard materials" disclosed herein include, but are not limited to, tungsten carbide (e.g., tile or cemented), infiltrated tungsten carbide matrix, silicon carbide, silicon nitride, cubic boron nitride, and polycrystalline diamond. Thus, in some aspects, the "diamond reactive material" is partially or entirely composed of material(s) (e.g., metal, metal alloy, composite) that is softer (less hard) than superhard materials, such as less hard than tungsten carbide (e.g., tile or cemented), as determined in accordance with one of these hardness tests, such as the Brinell scale.

Interfacing Polycrystalline Diamond with Diamond Reactive Materials

In some aspects, the present disclosure provides for interfacing the engagement between a thrust face and an opposing thrust face with polycrystalline diamond elements in contact with a diamond reactive material. For example, the polycrystalline diamond elements may be positioned and arranged on one thrust face for contact with the other, opposing thrust face, where the other, opposing thrust face is formed of or includes at least some diamond reactive material. The polycrystalline diamond element may have an engagement surface for engagement with an opposing engagement surface of the diamond reactive material. As used herein, "engagement surface" refers to the surface of a material (e.g., polycrystalline diamond or diamond reactive materials) that is positioned and arranged within a thrust bearing assembly such that, in operation of the thrust bearing assembly, the engagement surface interfaces the contact between the two components (e.g., between the thrust face and the opposing thrust face). The "engagement surface" may also be referred to herein as the "thrust bearing surface" or "axial bearing surface" or "thrust face".

In some aspects the opposing engagement surface includes or is composed of at least 2 wt. % of diamond reactive material, or from 2 to 100 wt. %, or from 5 to 95 wt. %, or from 10 to 90 wt. %, or from 15 to 85 wt. %, or from 20 to 80 wt. %, or from 25 to 75 wt. %, or from 25 to 70 wt. %, or from 30 to 65 wt. %, or from 35 to 60 wt. %, or from 40 to 55 wt. %, or from 45 to 50 wt. % of diamond reactive material.

In certain applications, the polycrystalline diamond element, or at least the engagement surface thereof, is lapped or polished, optionally highly lapped or highly polished. Although highly polished polycrystalline diamond elements are preferred in at least some applications, the scope of this disclosure is not limited to highly polished polycrystalline diamond elements and includes polycrystalline diamond elements that are highly lapped or polished. As used herein, a surface is defined as "highly lapped" if the surface has a surface finish of 20 µin (about 0.51 microns) or about 20 µin (about 0.51 microns), such as a surface finish ranging from about 18 to about 22 µin (about 0.46 to about 0.56 microns). As used herein, a surface is defined as "polished" if the surface has a surface finish of less than about 10 µin (about 0.25 microns), or of from about 2 to about 10 pin (about 0.05 microns to about 0.25 microns). As used herein, a surface is defined as "highly polished" if the surface has a surface finish of less than about 2 µin (about 0.05 microns) or from about 0.5 µin to less than about 2 µin (about 0.01 microns to about 0.05 microns). In some aspects, the engagement surface has a surface finish ranging from 0.5 µin (about 0.01 microns) to 40 µin (about 1.02 microns), or from 2 µin (about 0.05 microns) to 30 µin (about 0.76 microns), or from 5 µin (about 0.13 microns) to 20 µin (about 0.51 microns), or from 8 µin (about 0.20 microns) to 15 µin (about 0.38 microns), or less than 20 µin (about 0.51 microns), or less than 10 µin (about 0.46 microns), or less than 2 µin (about 0.05 microns), or any range therebetween. Polycrystalline diamond that has been polished to a surface finish of 0.5 µin (about 0.01 microns) has a coefficient of friction that is about half of standard lapped polycrystalline diamond with a surface finish of 20-40 µin (about 0.51-1.02 microns). U.S.

Pat. Nos. 5,447,208 and 5,653,300 to Lund et al., the entireties of which are incorporated herein by reference, provide disclosure relevant to polishing of polycrystalline diamond. As would be understood by one skilled in the art, surface finish may be measured with a profilometer or with Atomic Force Microscopy.

Exemplary Thrust Bearings

Turning now to the Figures, exemplary, non-limiting embodiments of the thrust bearings will now be described. Throughout the Figures, like reference numerals indicate like elements. For example, in FIGS. 2A and 2B, the reference numeral 202 refers to the engagement surfaces of the polycrystalline diamond elements, and in FIGS. 3A and 3B, the reference numeral 302 refers to the engagement surfaces of the polycrystalline diamond elements.

Figure 2A:
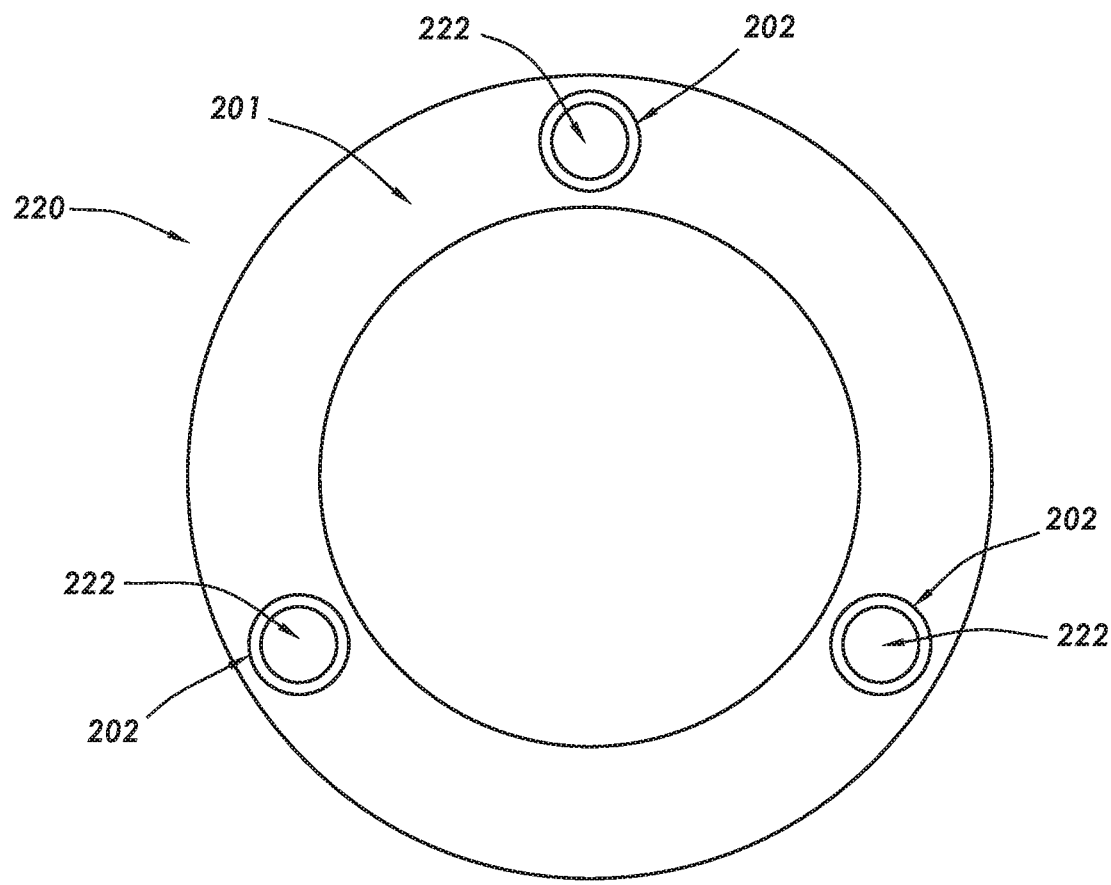
FIG. 2A is a top view of polycrystalline diamond thrust face of a thrust bearing of an embodiment of the technology of this application.

FIG. 2A depicts a top view of thrust ring 220 having thrust face 201 in accordance with an embodiment of the technology of this application. Thrust face 201 (also referred to as polycrystalline diamond thrust face) includes polycrystalline diamond elements 202 embedded within, attached to, or otherwise coupled with and/or engaged with thrust face 201. Polycrystalline diamond elements 202 may be mounted directly to thrust face 201 via methods known in the art including, but not limited to, brazing, gluing, press fitting, shrink fitting, or threading. While thrust face 201 is shown and described as having three polycrystalline diamond elements 202, one skilled in the art would understand that thrust face 201 may include more or less than three polycrystalline diamond elements 202. Also, while shown has evenly spaced, one skilled in the art would understand that the spacing between polycrystalline diamond elements 202 may be even or uneven. Further, one skilled in the art would understand that the spacing between polycrystalline diamond elements 202 may be more or less than as shown in FIG. 2A.

Each polycrystalline diamond element 202 includes an engagement surface 222. Engagement surfaces 222 may be a surface layer of lapped, polished, highly lapped, or highly polished polycrystalline diamond. In some aspects, engagement surfaces 222 may be planar or convex.

Figure 2B:
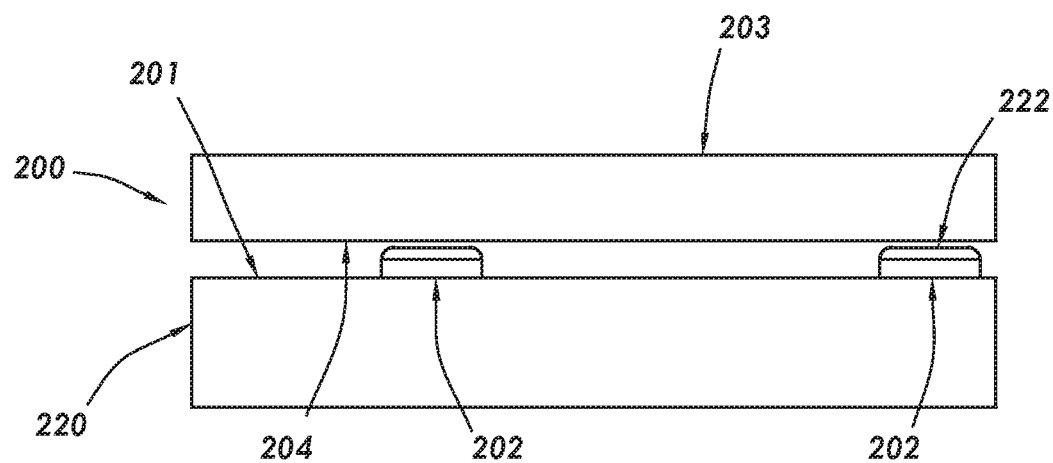
FIG. 2B is a side view of the polycrystalline diamond thrust face of FIG. 2A in sliding contact with an opposing thrust face formed of or including at least some diamond reactive material.

FIG. 2B depicts thrust bearing assembly 200, including thrust face 201 of thrust ring 220 in sliding contact with opposing thrust face 204 of opposing thrust ring 203. Thrust ring 203 and opposing thrust face 204 are formed of or includes at least some diamond reactive material. Thus, in operation, when thrust bearing assembly 200 is bearing load, engagement surfaces 222 are in sliding contact with opposing thrust face 204 (also referred to as opposing engagement surface).

While both thrust rings 220 and 203 are shown having the shape of a ring, one skilled in the art would understand that the thrust faces disclosed herein may be formed on thrust components of other shapes suitable for thrust bearing depending upon the particular application.

Figure 3A:
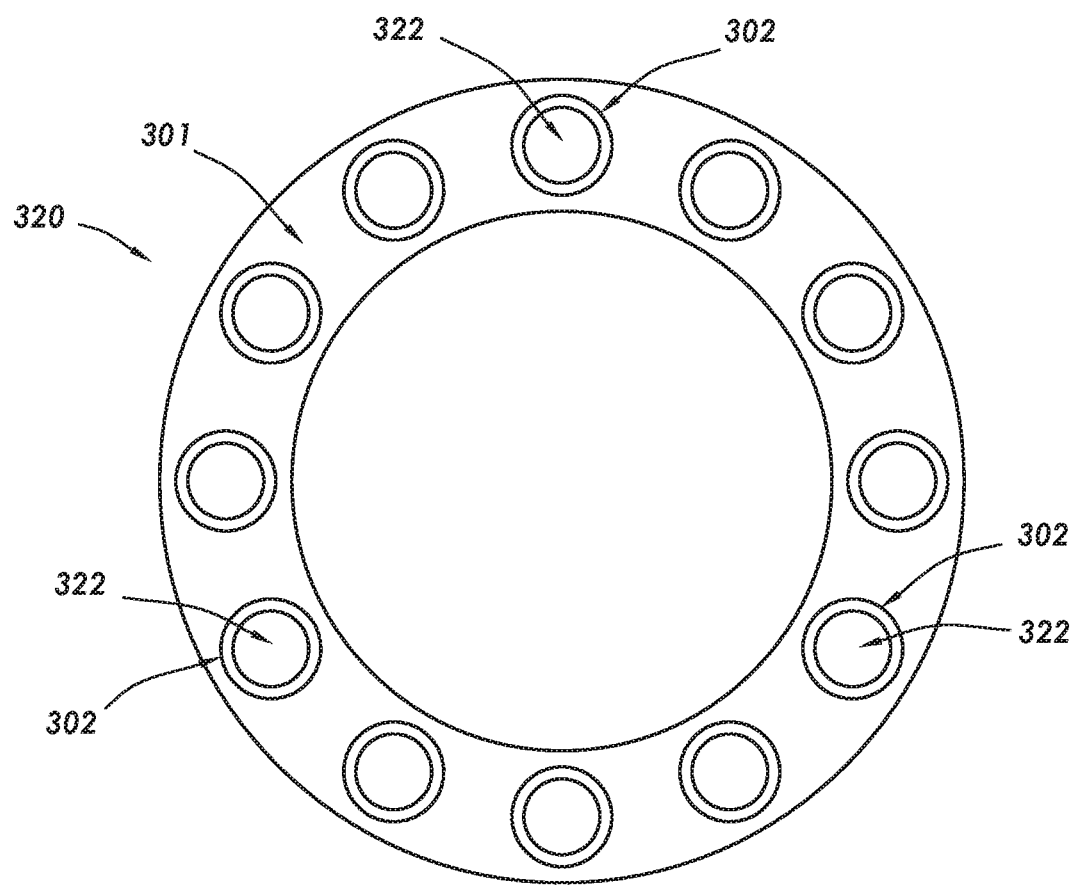
FIG. 3A is a top view of polycrystalline diamond thrust face of a thrust bearing of an embodiment of the technology of this application.

FIG. 3A depicts a top view of thrust ring 320 having thrust face 301 with a plurality of polycrystalline diamond elements 302 coupled therewith in accordance with an embodiment of the technology of this application. In this embodiment, thrust face 301 is set with twelve polycrystalline diamond elements 302, each having an engagement surface 322.

Figure 3B:
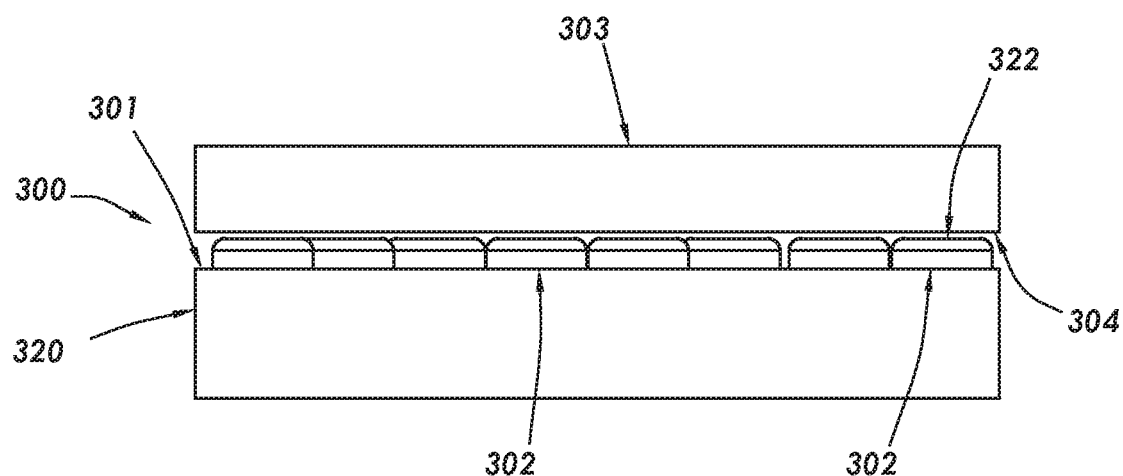
FIG. 3B is a side view of the polycrystalline diamond thrust face of FIG. 3A in sliding contact with an opposing thrust face formed of or including at least some diamond reactive material.

FIG. 3B depicts a side view thrust bearing assembly 300, including thrust face 301 of FIG. 3A in sliding contact with thrust face 304, such that engagement surfaces 322 are in sliding contact with opposing thrust face 304, which is formed of or includes at least some diamond reactive material.

Polycrystalline Diamond Layer with Edge Radius

Figure 4:
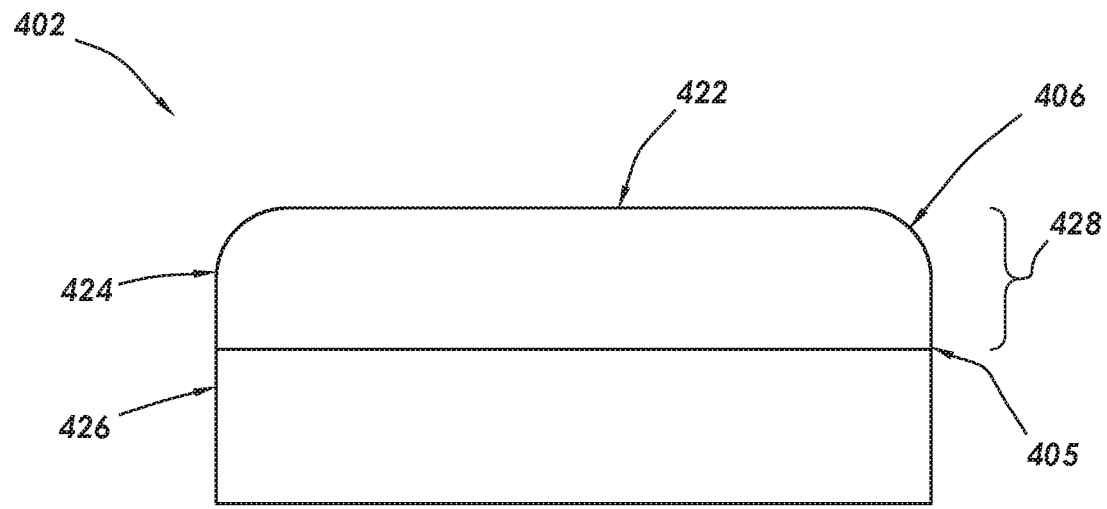
FIG. 4 is a side view of an exemplary polycrystalline diamond element of an embodiment of the technology of this application.

FIG. 4 depicts a side view of an exemplary polycrystalline diamond element 402 of an embodiment of the technology of this application. In this example, polycrystalline diamond element 402 includes polycrystalline diamond layer 424 supported by tungsten carbide substrate 426. A diamond-to-substrate interface line is indicated at 405.

Opposite the interface between polycrystalline diamond layer 424 and tungsten carbide substrate 426 (i.e., opposite diamond-to-substrate interface line 405), engagement surface 422 is formed on polycrystalline diamond layer 424. Engagement surface 422 may be a top surface of polycrystalline diamond layer 424 that has been lapped, polished, highly lapped, or highly polished. As shown, from diamond-to-substrate interface line 405 to engagement surface 422, along side edge 428, polycrystalline diamond layer 424 has a relatively significant edge radius 406. One skilled in the art would understand that polycrystalline diamond layers disclosed herein are not limited to this particular shape and are not limited to being supported on tungsten carbide or to be supported at all.

Polycrystalline Diamond Layer with Arcuate Edge

Figure 5:
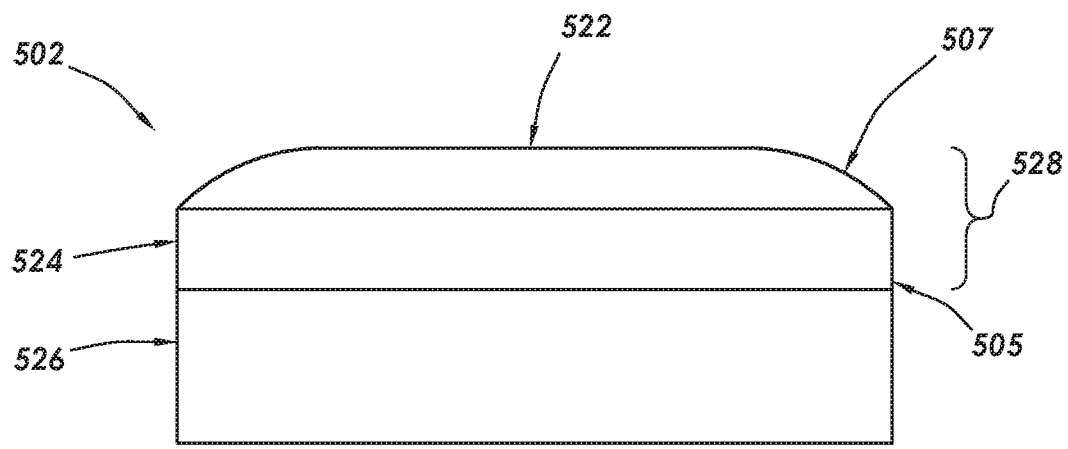
FIG. 5 is a side view of an exemplary polycrystalline diamond element of an embodiment of the technology of this application.

FIG. 5 depicts a side view of an exemplary polycrystalline diamond element 502 of an embodiment of the technology of this application. In this example, polycrystalline diamond layer 524 is supported by tungsten carbide substrate 526, and interfaces therewith at diamond-to-substrate interface line 505. Polycrystalline diamond element 502 is substantially similar to polycrystalline diamond element 402, with the exception that polycrystalline diamond layer 524 has more arcuate edge 507 in comparison to edge radius 406. Arcuate edge 507 of polycrystalline diamond layer 524 may be provided via arcuate edge treatments, as is known in the art. Also shown in side edge 528.

Polycrystalline Diamond Layer with Large Edge Radius

Figure 6:
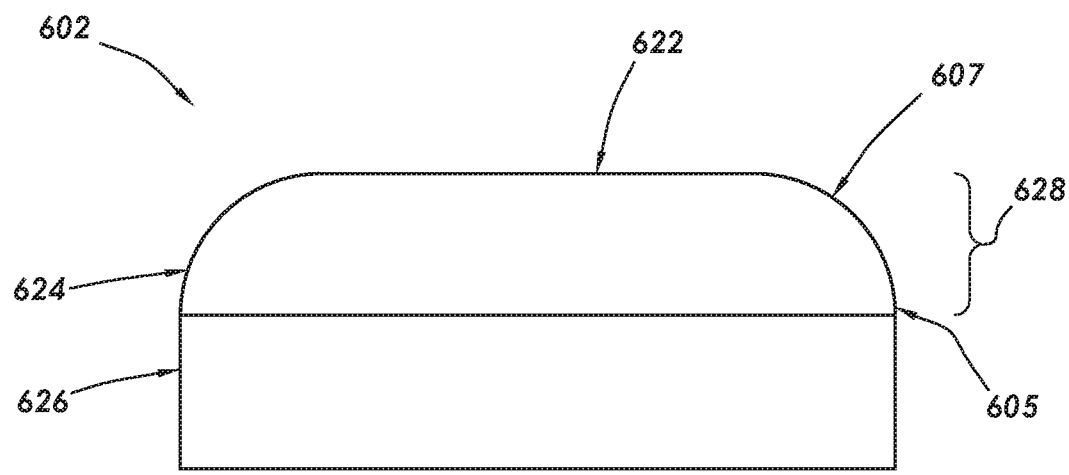
FIG. 6 is a side view of an exemplary polycrystalline diamond element of an embodiment of the technology of this application.

FIG. 6 depicts a side view of an exemplary polycrystalline diamond element 602 of an embodiment of the technology of this application. In this example, polycrystalline diamond layer 624 is supported by tungsten carbide substrate 626, with diamond-to-substrate interface line shown at 605. Polycrystalline diamond element 602 is substantially similar to polycrystalline diamond element 402, with the exception that polycrystalline diamond layer 624 has a large radius edge 607. Large radius edge 607 may be provided via large radius edge treatments, as is known in the art. Also shown in side edge 628.

Polycrystalline Diamond Layer with Larger Edge Radius

Figure 7:
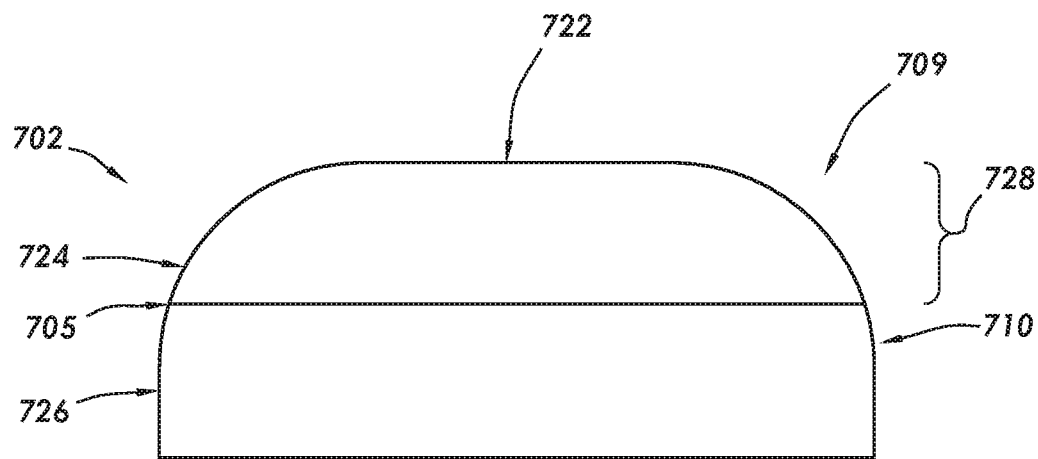
FIG. 7 is a side view of an exemplary polycrystalline diamond element of an embodiment of the technology of this application.

FIG. 7 depicts a side view of an exemplary polycrystalline diamond element 702 of an embodiment of the technology of this application. In this example, polycrystalline diamond layer 724 is supported by tungsten carbide substrate 726, with diamond-to-substrate interface line shown at 705. Polycrystalline diamond element 702 is substantially similar to polycrystalline diamond element 602, with the exception that polycrystalline diamond layer 724 has an even larger radius edge 709, which may be provided via large radius edge treatments, as is known in the art. In this example, the edge radius begins, not on the polycrystalline diamond layer 724, as is the case in polycrystalline diamond element 602, but in the tungsten carbide substrate 726 at tangent point 710. Also shown is side edge 728.

Polycrystalline Diamond Layer with Multi-Component Edge

Figure 8:
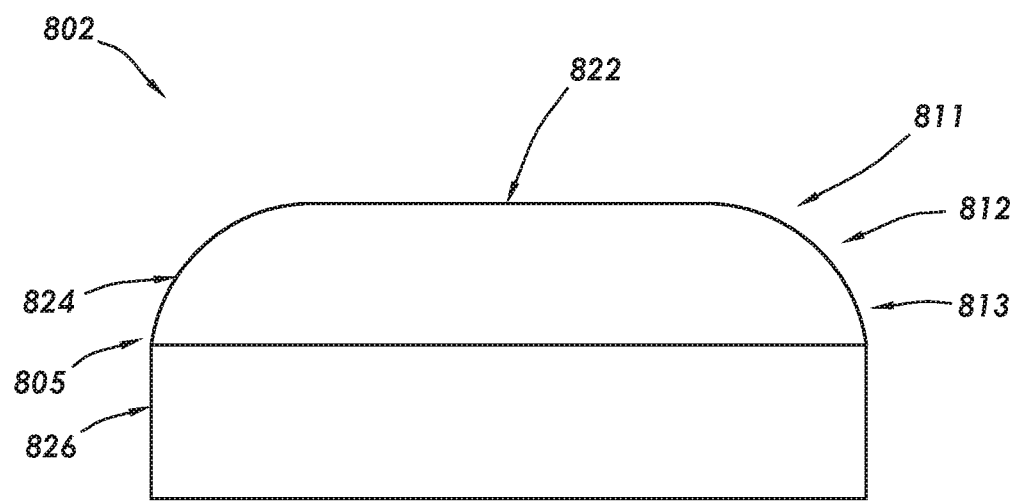
FIG. 8 is a side view of an exemplary polycrystalline diamond element of an embodiment of the technology of this application.

FIG. 8 depicts a side view of an exemplary polycrystalline diamond element 802 of an embodiment of the technology of this application. In this example, polycrystalline diamond layer 824 is supported by tungsten carbide substrate 826, with diamond-to-substrate interface line shown at 805. Polycrystalline diamond layer 824 has been treated via multi-component edge treatment, including edge radius 811 connected to chamfer angle 812, which is connected to additional edge radius 813.

Thus, in some embodiments the thrust bearings of the present application are high-performance thrust bearings, where a diamond reactive material of an opposing thrust face is put into sliding contact with at least one polycrystalline diamond element mounted on another thrust face. The polycrystalline diamond element(s) of the thrust face are preferably planar but may be convex. Further, although three or more polycrystalline diamond elements are preferred, the technology of the application may be practiced with as few as one or two polycrystalline diamond elements. Even use of a single polycrystalline diamond element in sliding contact with an opposing diamond reactive material surface may result in a decrease in the coefficient of friction between the thrust bearing surfaces (thrust faces) and may act to break up or reduce galling between the surfaces.

At least some embodiments of the thrust bearings disclosed herein are suitable for use in harsh environments. At least Some embodiments of the thrust bearings disclosed herein are less susceptible to polycrystalline diamond fracture in comparison to thrust bearings that have polycrystalline diamond-to-polycrystalline diamond engagement. Thus, the thrust bearings provided by the technology of this application are harsh-environment suitable thrust bearings that provide enhanced service value in comparison to thrust bearings that have polycrystalline diamond-to-polycrystalline diamond engagement.

Preclusion of Edge Contact

A key performance criterion of at least some embodiments of the presently disclosed thrust bearings is that the polycrystalline diamond bearing element(s) are configured (i.e., positioned, arranged) in such a way as to preclude any edge contact between the polycrystalline diamond bearing element and the opposing component formed of or including at least some the diamond reactive material (i.e., the opposing thrust face). One preferred method of accomplishing this key performance criterion is to employ polycrystalline diamond elements that have relatively significant edge radii. The edge radii of the polycrystalline diamond elements are such that, if tilt or misalignment of one or both of the thrust faces occurs, the edge radii of the polycrystalline diamond elements will present a blunt surface to the opposing thrust face that is formed of or includes at least some diamond reactive material, rather than presenting a sharp edge that could lead to machining or cutting or scribing of the surface of the diamond reactive material. Without limiting this disclosure, in certain embodiments traditionally chamfered polycrystalline diamond edge treatments are not preferred.

Figure 9:
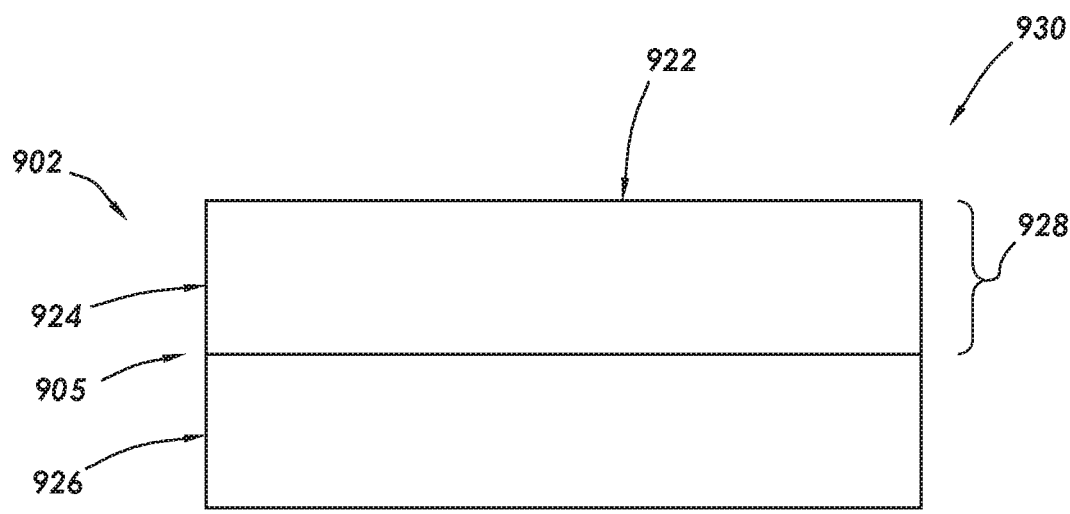
FIG. 9 is a side view of a polycrystalline diamond element without edge treatment, having a sharp corner.

In some embodiments, the engagement surface has blunted edges. The polycrystalline diamond edge treatments shown and described with reference to FIGS. 4-8 provide non-limiting methods of blunting the edges of an otherwise planar face (engagement surfaces 422, 522, 622, 722, 822) of the respective polycrystalline diamond elements. Such blunting of the edges of the planar faces avoids the occurrence of machining or cutting between the opposing thrust faces, such as if either of the polycrystalline diamond thrust face (engagement surfaces) and the opposing thrust face of diamond reactive material experience a tilting or misalignment. If such a tilting or misalignment occurred, and the polycrystalline diamond layer of the polycrystalline diamond element had a sharp edge 930, as is shown in FIG. 9, rather than a treated edge, the sharp edge 930 could machine, cut, or otherwise undesirably engage with the opposing thrust face. Also shown in depiction of polycrystalline diamond element 902 in FIG. 9 are engagement surface 922, side edge 928, polycrystalline diamond layer 924, diamond-to-substrate interface line 905, and tungsten carbide substrate 926.

Figure 10A:
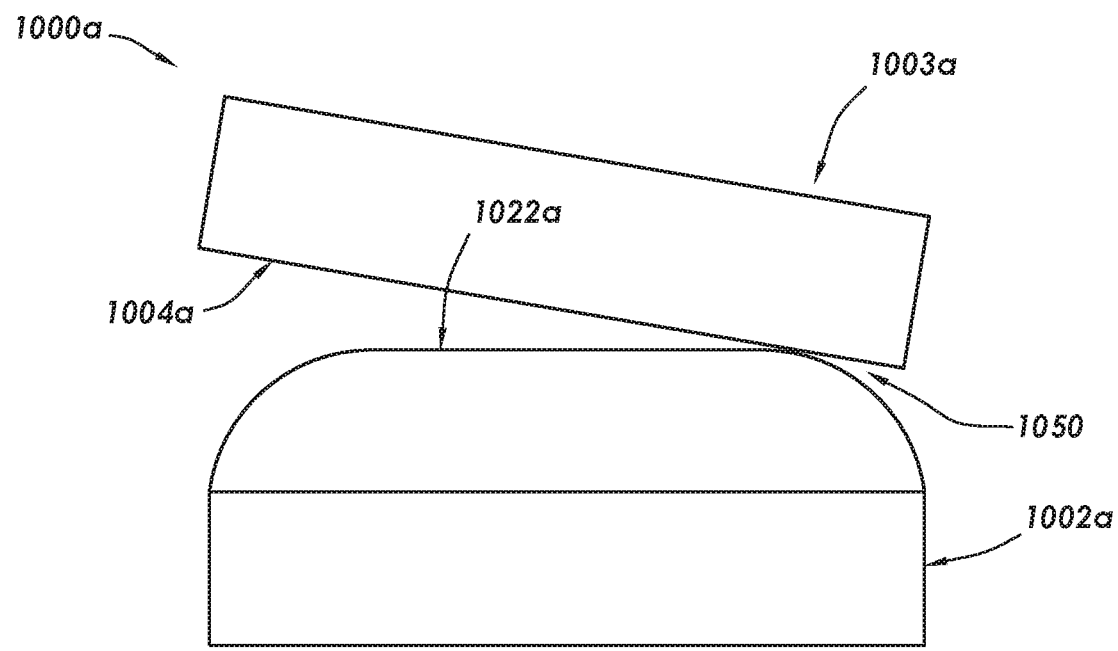
FIG. 10A is a simplified depiction of edge contact between a polycrystalline diamond element having undergone edge treatment and an opposing thrust face.
Figure 10B:
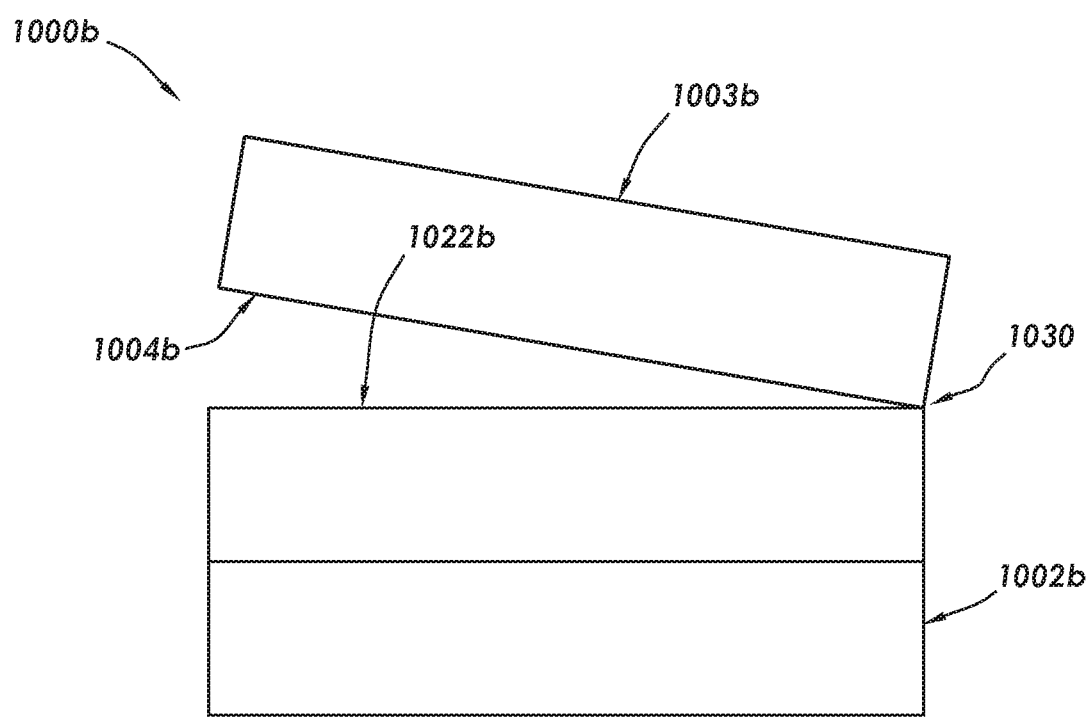
FIG. 10B is a simplified depiction of edge contact between a polycrystalline diamond element not having undergone edge treatment, with a sharp corner, and an opposing thrust face.

FIGS. 10A and 10B illustrate the use an edge-treated polycrystalline diamond element and a polycrystalline diamond element that is not edge-treated, respectively. FIG. 10A depicts a portion of a thrust bearing assembly 1000a, showing polycrystalline diamond element 1002a in sliding contact with thrust ring 1003a (only a portion of which is shown). In FIG. 10A, thrust ring 1003a is tilted or misaligned relative to polycrystalline diamond element 1002a, such that the plane defined by thrust face 1004a is at an angle relative to the plane defined by engagement surface 1022a. Thus, thrust face 1004a engaged with edge 1050 of polycrystalline diamond element 1002a.

Similar to FIG. 10A, FIG. 10B depicts a portion of a thrust bearing assembly 1000b, showing polycrystalline diamond element 1002b in sliding contact with thrust ring 1003b (only a portion of which is shown). In FIG. 10B, thrust ring 1003b is tilted or misaligned relative to polycrystalline diamond element 1002b, such that the plane defined by thrust face 1004b is at an angle relative to the plane defined by engagement surface 1022b. Thus, thrust face 1004b engaged with edge 1030 of polycrystalline diamond element 1002b. However, because polycrystalline diamond element 1002a is subjected to edge treatment, edge 1050 is blunter in comparison to edge 1030, which is sharp. As edge 1030 is sharp, edge 1030 can machine, cut, or otherwise undesirably engage with thrust face 1004b. However, as edge 1050 is blunt, the occurrence of such machining or cutting is reduced or eliminated in the embodiment depicted in FIG. 10A.

In certain aspects, the thrust bearings disclosed herein include a polycrystalline diamond layer that has an edge radius that is at least a 0.050" (0.127 cm) radius. In certain aspects, the thrust bearings disclosed herein include a polycrystalline diamond layer that has an edge radius that is at least a 0.060" (0.1524 cm) radius, or at least a 0.070" (0.1778 cm) radius, or at least a 0.080" (0.2032 cm) radius, or at least a 0.090" (0.2286 cm) radius.

Polycrystalline Diamond Element

In certain applications, the polycrystalline diamond elements disclosed herein have increased cobalt content transitions layers between the outer polycrystalline diamond surface and a supporting tungsten carbide slug, as is known in the art.

The polycrystalline diamond elements may be supported by tungsten carbide, or may be unsupported, "standalone" polycrystalline diamond elements that are mounted directly to the bearing component (e.g., thrust ring).

The polycrystalline diamond elements may by non-leached, leached, leached and backfilled, thermally stable, coated via chemical vapor deposition (CVD), or processed in various ways as known in the art.

Polycrystalline Diamond Element—Shapes, Sizes, and Arrangements

The polycrystalline diamond elements may have diameters as small as 3 mm (about ⅛") or as large as 75 mm (about 3"), depending on the application and the configuration and diameter of the bearing. Typically, the polycrystalline diamond elements have diameters between 8 mm (about ⁵⁄₁₆") and 25 mm (about 1").

Although the polycrystalline diamond elements are most commonly available in cylindrical shapes, it is understood that the technology of the application may be practiced with polycrystalline diamond elements that are square, rectangular, oval, any of the shapes described herein with reference to the Figures, or any other appropriate shape known in the art.

In some applications, the polycrystalline diamond elements are deployed in rings along the bearing component (i.e., thrust ring). The polycrystalline diamond bearing elements of the present technology may be deployed in rings around the deployed thrust face. A non-limiting example is a ring of five planar face polycrystalline diamond bearing elements for engagement with an opposing thrust face formed of or including at least some diamond reactive material. Without being bound by theory, a comparable thrust bearing having a polycrystalline diamond thrust face-to-polycrystalline diamond thrust face (as opposed to a polycrystalline diamond thrust face-to-diamond reactive material thrust face) could require more than 20 or even 30 total polycrystalline diamond elements to bear axial load. Thus, some embodiments of the technology of this application provide polycrystalline diamond thrust bearings having a greater spacing between individual polycrystalline diamond elements than is achievable in thrust bearings that have polycrystalline diamond thrust face-to-polycrystalline diamond thrust face contact. With the technology of the present application, the polycrystalline diamond elements may be arranged in any pattern, layout, spacing, or staggering to provide the desired support, without concern for the need for overlapping contact with polycrystalline diamond surfaces on the opposing bearing face.

Polycrystalline Diamond Element—Mounting

As previously described, the polycrystalline diamond elements may be mounted directly to the bearing element (e.g., thrust ring) via methods known in the art including, but not limited to, brazing, gluing, press fitting, shrink fitting, or threading. The polycrystalline diamond elements may be mounted in a separate ring or rings. The ring or rings may then be deployed on the bearing element via methods known in the art including, but not limited to, gluing, press fitting, thread locking, or brazing.

Planar face or domed polycrystalline diamond elements may be mounted in a manner to allow them to rotate about their own axis. Reference is made to U.S. Pat. No. 8,881,849, to Shen et. al., as a non-limiting example of a method to allow the polycrystalline diamond element to spin about its own axis while in facial contact with subject material.

Treatment of Opposing Engagement Surface

In some aspects, the opposing engaging surface of the diamond reactive material is pre-saturated with carbon (e.g., prior to engagement with the engagement surface). Such pre-saturation reduces the ability of the diamond reactive material to attract carbon through graphitization of the surface of the polycrystalline diamond. The pre-saturation of the diamond reactive material surface contact area may be accomplished via any method known in the art.

In certain applications, a solid lubricant source, for example, a graphite or hexagonal boron nitride stick or inclusion, either energized or not energized, is in contact with the opposing engagement surface formed of or including at least some the diamond reactive material.

In lubricated environments, the bearing assemblies may benefit from the hydrodynamic effect of the lubricant creating a clearance between the moving and stationary elements of the bearing assembly.

Exemplary Testing

In an effort to develop a robust cam follower interface for use in Applicants' previously referenced "Drilling Machine" of U.S. patent application Ser. No. 15/430,254 (the '254 Application), Applicants designed and constructed an advanced test bench. The test bench employed a 200 RPM electric gearmotor driving a hard-faced ferrous rotor mandrel inside a hard-faced ferrous stator housing. The mandrel incorporated a non-hard faced offset camming cylinder midway along its length. The rotor/stator assembly was fed a circulating fluid through the use of a positive displacement pump. Candidate cam follower interface mechanisms were placed in sealed contact and under load with the camming cylinder of the rotor mandrel. Employing the test bench, candidate interface mechanisms were tested for survivability and wear under loads ranging from 500 to 3000 lbf either in clear water or in sand laden drilling fluid.

The Applicants conducted testing of the ferrous camming cylinder in sliding contact with polished polycrystalline diamond surfaces without deleterious effects or apparent chemical interaction. At least some diamond reactive materials, such as ferrous materials, are attractive for bearing applications due to their ready availability, ease of forming and machining, higher elasticity, and lower cost than so called superhard materials.

The testing program conducted by the Applicants has established that, even at relatively high loads and high RPM speeds, a successful load interface between polycrystalline diamond and diamond reactive materials can be employed in bearing applications.

A key finding has been that, as long as polycrystalline diamond elements are not put into edge or point contact with diamond reactive materials, which, it is believed, could lead to machining and chemical interaction, the polycrystalline diamond can experience sliding contact with diamond reactive materials at the typical bearing loads and speeds called for in many applications. This unexpected and surprising success of the Applicants' testing has led to the development of new high performance radial bearings.

The testing program included tests of a curved ferrous surface in high load facial linear area contact with planar polycrystalline diamond under rotation. This testing produced a slightly discolored Hertzian contact area on the face of the PDC about 0.250" (0.635 cm) in width along the entire ½" (1.27 cm) wide face of the polycrystalline diamond. The width of the contact area can be explained by the cam offset, vibration in the system and by slight deformation of the ferrous metal under load. It is estimated that the total contact area on the ½" (0.635 cm) polycrystalline diamond element face, at any given point in time, is about 7%, or less, of the total area of the polycrystalline diamond element face. The configuration employed in the testing demonstrates that even a small surface area on the face of a polycrystalline diamond element can take significant load.

Additional testing of a spherical ferrous ball under load and rotation against a planar polycrystalline diamond face produced a small, approximately 0.030 diameter, discolored Hertzian contact area in the center of the polycrystalline diamond element. As in the contact explanation above, it is believed, without being bound by theory, that the diameter of the discoloration is a result of slight vibration in the test apparatus and by slight deformation of the ferrous metal under load.

Table 2, below, sets forth data summarizing the testing performed by the Applicants of various configurations of sliding interface.

TABLE 2

| | | RPM | Surface Speed | Loading | Result |
|---|---|---|---|---|---|
| | Tested Mechanism - Bearing Steel Ball in Alloy Steel Cup Against Rotating Steel Cam Surface | | | | |
| Test 1 | 1.50 Ball Socket | 200 | 1.13 m/s | 1200 lb | Abort after 3 minutes, ball is not rolling, heavy galling on ball and cup |
| Test 2 | 1.25 Ball Socket | 200 | 1.13 m/s | 500 lb | Abort after 3 minutes, ball is not rolling, heavy galling on ball and cup |
| Test 3 | Single Polished PDC 1.50 Ball | 200 | 1.13 m/s | 700 lb | Ball is rolling, wear of steel on side wall of cup after 45 minutes |
| Test 4 | Tripod Polished PDC 1.50 Ball Tested Mechanism - Planar PDC Rotating Steel Cam Surface | 200 | 1.13 m/s | 700 lb | 20 hr. test, little wear on Ball slight Hertzian trace on PDCs |
| Test 5 | Single Polished PDC Slider | 200 | 1.13 m/s | 900 lb | Ran 20 hours, PDC direct on steel cam in water. Slight, small Hertzian trace on PDC |
| Test 6 | Single Polished PDC Slider | 200 | 1.13 m/s | 900 lb | Varied load from zero, 4 hrs, good results in water. Slight, small Hertzian trace on PDC |
| Test 7 | Single Polished PDC Slider | 200 | 1.13 m/s | 2000 lb | Varied load from zero, 20 hrs, good results in water. Slight, small Hertzian trace on PDC |
| Test 8 | Single Polished PDC Slider | 200 | 1.13 m/s | 2000 lb | Drilling Fluid & Sand test, 32+ hrs, good results. Slight, small Hertzian trace on PDC |
| Test 9 | Single Polished PDC Slider | 200 | 1.13 m/s | 3000 lb | Mud test at 3000 lbf, 10 hrs, good results. Slight, small Hertzian trace on PDC |
| Test 10 | Single Polished vs Single Unpolished | 200 | 1.13 m/s | 1100 lb | Mud test, 2 hours each, Unpolished coefficient of friction at least 50% higher by ampere measurement |

Tests 1 and 2 summarize failed tests of individual steel balls rolling in a steel cup under load. Test 3 summarizes the results of a more successful test of a steel ball supported by a single polished PDC element in a steel cup. Test 4 summarizes a very successful test of a single steel ball supported by an array of three polished polycrystalline diamond elements in a steel cup. Tests 5 through 9 summarize increasingly rigorous tests each of a single polished polycrystalline diamond element in sliding contact with a rotating ferrous cam surface. Test 10 summarizes a comparative test of a single polished polycrystalline diamond element versus a single unpolished polycrystalline diamond element, each in sliding contact with a rotating ferrous cam surface. The final test shows a significant increase in coefficient of friction when the unpolished polycrystalline diamond element was used. The conditions and results presented in Table 2 are emblematic of the potential use of polycrystalline diamond on diamond reactive material and are not to be considered limiting or fully encompassing of the technology of the application.

Testing Conclusions

Without being bound by theory, in operation, running a cam and cam follower in a liquid cooled, lubricated environment, allows for higher speeds and loads to be attained without commencing a thermo-chemical reaction. Further, a polycrystalline diamond face that has been polished, notably, provides a lower thermo-chemical response.

From the descriptions and figures provided above it can readily be understood that the bearing assembly technology of the present application may be employed in a broad spectrum of applications, including those in downhole environments. The technology provided herein additionally has broad application to other industrial applications.

Furthermore, while shown and described in relation to engagement between surfaces of thrust bearing assemblies, one skilled in the art would understand that the present disclosure is not limited to this particular application and that the concepts disclosed herein may be applied to the engagement between any diamond reactive material surface that is engaged with the surface of a diamond material.

Although the present embodiments and advantages have been described in detail, it should be understood that various changes, substitutions and alterations can be made herein without departing from the spirit and scope of the disclosure. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A thrust bearing assembly comprising:
   a thrust face comprising a polycrystalline diamond element, the polycrystalline diamond element having an engagement surface thereon; and
   an opposing thrust face comprising a diamond reactive material, wherein the engagement surface is engaged with the opposing thrust face.

2. The thrust bearing assembly of claim 1, wherein the engagement surface of the polycrystalline diamond element is planar.

3. The thrust bearing assembly of claim 1, wherein the engagement surface of the polycrystalline diamond element is convex.

4. The thrust bearing assembly of claim 1, wherein the engagement surface of the polycrystalline diamond element is highly lapped, polished, or highly polished.

5. The thrust bearing assembly of claim 1, wherein the engagement surface of the polycrystalline diamond element has a surface finish that is equal to or less than 20 μm.

6. The thrust bearing assembly of claim 1, wherein the opposing thrust surface is saturated with carbon.

7. The thrust bearing assembly of claim 1, further comprising a solid lubricant on the opposing thrust face.

8. The thrust bearing assembly of claim 1, wherein the opposing thrust face is a metal surface, wherein the diamond reactive material includes diamond catalyst or diamond solvent, the diamond catalyst or diamond solvent including iron or an alloy thereof, cobalt or an alloy thereof, nickel or an alloy thereof, ruthenium or an alloy thereof, rhodium or an alloy thereof, palladium or an alloy thereof, chromium or an alloy thereof, manganese or an alloy thereof, copper or an alloy thereof; titanium or an alloy thereof; or tantalum or an alloy thereof.

9. The thrust bearing assembly of claim 1, wherein the polycrystalline diamond element is attached to the thrust face via gluing, brazing, shrink fitting, threading, or press fitting.

10. The thrust bearing assembly of claim 1, wherein the thrust bearing assembly comprises:
 a thrust ring defining the thrust face and having the polycrystalline diamond elements coupled therewith; and
 an opposing thrust ring defining the opposing thrust face, wherein the opposing thrust ring includes the diamond reactive material.

11. The thrust bearing assembly of claim 1, wherein edges of the engagement surface of the polycrystalline diamond elements have an edge radius.

12. The thrust bearing assembly of claim 11, wherein the edge radius is an at least 0.127 cm radius.

13. The thrust bearing assembly of claim 1, wherein the polycrystalline diamond element comprises a polycrystalline diamond layer having a first end and a second end, wherein at the first end the polycrystalline diamond layer is supported on a substrate, and wherein the engagement surface is on the second end.

14. The thrust bearing assembly of claim 13, wherein the substrate is a tungsten carbide substrate.

15. The thrust bearing assembly of claim 1, wherein the engagement surface has blunted edges.

16. The thrust bearing assembly of claim 1, wherein, when the thrust bearing assembly bears load, the engagement surface maintains sliding contact with the opposing thrust face.

17. The thrust bearing assembly of claim 1, wherein the polycrystalline diamond element is static relative to the opposing thrust face.

18. The thrust bearing assembly of claim 1, wherein the diamond reactive material is softer than a superhard material, as determined in accordance with ASTM E10-14.

19. The thrust bearing assembly of claim 1, wherein the opposing thrust face is a metal surface, and wherein the diamond reactive material is a metal or metal alloy that contains from 45 to 100 weight percent of iron, cobalt, nickel, ruthenium, rhodium, palladium, chromium, manganese, copper, titanium, tantalum, or an alloy thereof.

20. The thrust bearing assembly of claim 1, wherein the diamond reactive material comprises from 50 to 100 weight percent of diamond catalyst or diamond solvent.

21. The thrust bearing assembly of claim 1, wherein the opposing thrust face is a metal surface, and wherein the diamond reactive material includes a diamond catalyst or diamond solvent, wherein the diamond catalyst or diamond solvent includes an iron-based, cobalt-based, or nickel-based superalloy.

22. The thrust bearing assembly of claim 1, wherein the opposing thrust face is a metal surface.

23. A method of bearing axial load, the method comprising:
 engaging a thrust face with an opposing thrust face, wherein the thrust face includes a polycrystalline diamond element coupled therewith, the polycrystalline diamond element having an engagement surface thereon, wherein the opposing thrust face comprises a diamond reactive material, and wherein the engagement surface is engaged with the opposing thrust face.

24. The method of claim 23, further comprising, prior to coupling the thrust face and opposing thrust face, lapping, polishing, or highly polishing the engagement surface.

25. The method of claim 24, wherein the engagement surface is provided with a surface finish that is equal to or less than 20 μm.

26. The method of claim 23, wherein coupling the thrust face with the opposing thrust face includes avoiding edge and point contact between the polycrystalline diamond element and the opposing thrust face.

27. The method of claim 23, further comprising, prior to coupling the thrust face and opposing thrust face, treating edges of the engagement surface of the polycrystalline diamond element to provide an edge radius thereto.

28. The method of claim 27, wherein the edge radius is an at least 0.127 cm radius.

29. The method of claim 23, further comprising providing the polycrystalline diamond element by supporting a polycrystalline diamond layer on a substrate.

30. The method of claim 23, further comprising, prior to coupling the thrust face and opposing thrust face, saturating the opposing thrust face with carbon.

31. The method of claim 23, further comprising, prior to coupling the thrust face and opposing thrust face, lubricating the opposing thrust face with a solid lubricant.

32. The method of claim 23, wherein the opposing thrust face is a metal surface, wherein the diamond reactive material includes diamond catalyst or diamond solvent, the diamond catalyst or diamond solvent including iron or an alloy thereof, cobalt or an alloy thereof, nickel or an alloy thereof, ruthenium or an alloy thereof, rhodium or an alloy thereof, palladium or an alloy thereof, chromium or an alloy thereof, manganese or an alloy thereof, copper or an alloy thereof; titanium or an alloy thereof; or tantalum or an alloy thereof; or
 wherein the opposing thrust face is a metal surface, wherein the diamond reactive material includes diamond catalyst or diamond solvent, the diamond catalyst or diamond solvent including an iron-based, cobalt-based, or nickel-based superalloy.

33. The method of claim 23, wherein the polycrystalline diamond element is provided by attaching the polycrystalline diamond element to the thrust face via gluing, brazing, shrink fitting, threading, or press fitting.

34. A thrust bearing assembly comprising:
 a thrust ring defining a thrust face;
 a polycrystalline diamond element coupled with the thrust face, the polycrystalline diamond element defining an engagement surface; and
 an opposing thrust ring defining an opposing thrust face, wherein the opposing thrust ring comprises a diamond reactive material, and wherein the engagement surface is engaged with the opposing thrust face.

35. An assembly comprising:
an engagement surface comprising polycrystalline diamond; and
an opposing engagement surface comprising a diamond reactive material, wherein the engagement surface is slidably engaged with the opposing engagement surface.

* * * * *